(12) United States Patent
Ekambaram et al.

(10) Patent No.: US 11,443,345 B2
(45) Date of Patent: Sep. 13, 2022

(54) APPLICATION MODIFICATION USING SOFTWARE SERVICES

(71) Applicant: International Business Machines Corporation, Armonk, NY (US)

(72) Inventors: Vijay Ekambaram, Chennai (IN); Leigh Williamson, Austin, TX (US); Roger Snook, Charles Town, WV (US); Shinoj Zacharias, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 16/454,101

(22) Filed: Jun. 27, 2019

(65) Prior Publication Data

US 2020/0410543 A1    Dec. 31, 2020

(51) Int. Cl.
  *G06Q 30/02* (2012.01)
  *G06F 8/65* (2018.01)
  *G06N 20/00* (2019.01)

(52) U.S. Cl.
  CPC ........... *G06Q 30/0269* (2013.01); *G06F 8/65* (2013.01); *G06N 20/00* (2019.01)

(58) Field of Classification Search
  CPC ....... G06Q 30/0269; G06F 8/65; G06N 20/00
  See application file for complete search history.

(56) References Cited

U.S. PATENT DOCUMENTS

| 7,912,755 | B2 | 3/2011 | Perry | |
| 9,330,182 | B2 | 5/2016 | McGuire | |
| 9,454,764 | B2 | 9/2016 | King | |
| 9,582,264 | B1 | 2/2017 | Anbil Parthipan | |
| 2007/0162501 | A1* | 7/2007 | Agassi | G06Q 30/0621 |
| 2012/0233212 | A1 | 9/2012 | Newton | |
| 2014/0188631 | A1 | 7/2014 | Grigg | |
| 2014/0222582 | A1 | 8/2014 | Papalia | |
| 2014/0358657 | A1* | 12/2014 | Smullen | G06Q 30/0217 705/14.19 |
| 2016/0299756 | A1 | 10/2016 | Surazski | |

(Continued)

OTHER PUBLICATIONS

University of Chicago, App Store Economics, Why is EU Going after Google not Apple? Randy Picker (Year: 2018).*

(Continued)

*Primary Examiner* — Breffni Baggot
(74) *Attorney, Agent, or Firm* — Monchai Chuaychoo

(57) ABSTRACT

An approach for generating a modified software application by leveraging a customized advertisement between application owner and application vendor. The approach includes identifying a software application from a software application store repository and retrieving information from the software application store repository associated with the software application. The approach creates a requirement based on the retrieved information and identifying one or more vendor based on the requirement. After creating the targeted advertisement aimed at an application owner based on the identified vendor then the approach launches the advertisement campaign. The approach receives the notification from the application owner based on the advertisement to engage the identified vendor and modifies the software application based on the requirement.

20 Claims, 3 Drawing Sheets

(56) References Cited

U.S. PATENT DOCUMENTS

| | | | |
|---|---|---|---|
| 2016/0328400 A1 | 11/2016 | Dawson | |
| 2017/0228775 A1* | 8/2017 | Yamada | G06Q 30/0255 |
| 2017/0364433 A1 | 12/2017 | Kaulgud | |
| 2018/0121319 A1 | 5/2018 | Ekambaram | |
| 2018/0129511 A1* | 5/2018 | Krzyzanowski | G06Q 30/0601 |
| 2019/0114662 A1* | 4/2019 | Bennion | G06Q 30/0277 |

OTHER PUBLICATIONS

Approaches to Machine Learning, P. Langley at Carnegie-Mellon University (Year: 1984).*
Wiley Encyclopedia of Computer Science and Technology (Year: 2009).*

* cited by examiner

APPLICATION MODIFICATION USING SOFTWARE SERVICES

BACKGROUND OF THE INVENTION

The present invention relates generally to the field of software, and more particularly to providing a customized advertisement related to application stores.

An application or app is a computer program or computer software application designed to run on a mobile device and or specialized tablets and hybrid PCs. Applications are generally downloaded and/or retrieve from an application distribution platforms or repository which can be operated by the owner of the mobile or computer operating system. Furthermore, some applications are free, and while others have a fee structure that may require the user to make purchases to unlock certain features of the application or the pay up front to access the full feature of the application.

SUMMARY

Embodiments of the present invention disclose a computer-implemented method, computer program product and a computer system for generating a modified software application by leveraging a customized advertisement between application owner and application vendor. The computer-implemented method may be identifying, by one or more computer processors and based on machine learning, a software application from a software application store repository; retrieving, by the one or more computer processors, information from the software application store repository associated with the software application; creating, by the one or more computer processors and based on the machine learning, a requirement based on the retrieved information; identifying, by the one or more computer processors, one or more vendor based on the requirement; creating, by the one or more computer processors, a targeted advertisement aimed at an application owner based on the identified vendor; executing, by the one or more computer processors, an advertisement campaign based on the created target advertisement; receiving, by the one or more computer processors, a notification from the application owner to provide at least one service associated with the identified vendor to meet the requirement of the software application; and modifying, by the one or more computer processors, the software application based on the requirement.

The computer program product may include one or more computer readable storage media and program instructions stored on the one or more computer readable storage media, the program instructions comprising: program instructions to program instructions to identify a software application from a software application repository; program instructions to retrieve information from the software application repository associated with the software application; program instructions to create a requirement based on the retrieved information; program instructions to identify one or more vendor based on the requirement; program instructions to create a targeted advertisement aimed at an application owner based on the identified vendor; program instructions to execute an advertisement campaign based on the created target advertisement; program instructions receive a notification from the application owner to provide at least one service associated with the identified vendor to meet the requirement of the software application; and program instructions modify the software application based on the requirement.

The computer system may include one or more computer processors; one or more computer readable storage media; program instructions stored on the one or more computer readable storage media for execution by at least one of the one or more computer processors, the program instructions comprising: program instructions to identify a software application from a software application repository; program instructions to retrieve information from the software application repository associated with the software application; program instructions to create a requirement based on the retrieved information; program instructions to identify one or more vendor based on the requirement; program instructions to create a targeted advertisement aimed at an application owner based on the identified vendor; program instructions to execute an advertisement campaign based on the created target advertisement; program instructions receive a notification from the application owner to provide at least one service associated with the identified vendor to meet the requirement of the software application; and program instructions modify the software application based on the requirement.

DETAILED DESCRIPTION

Figure 1:
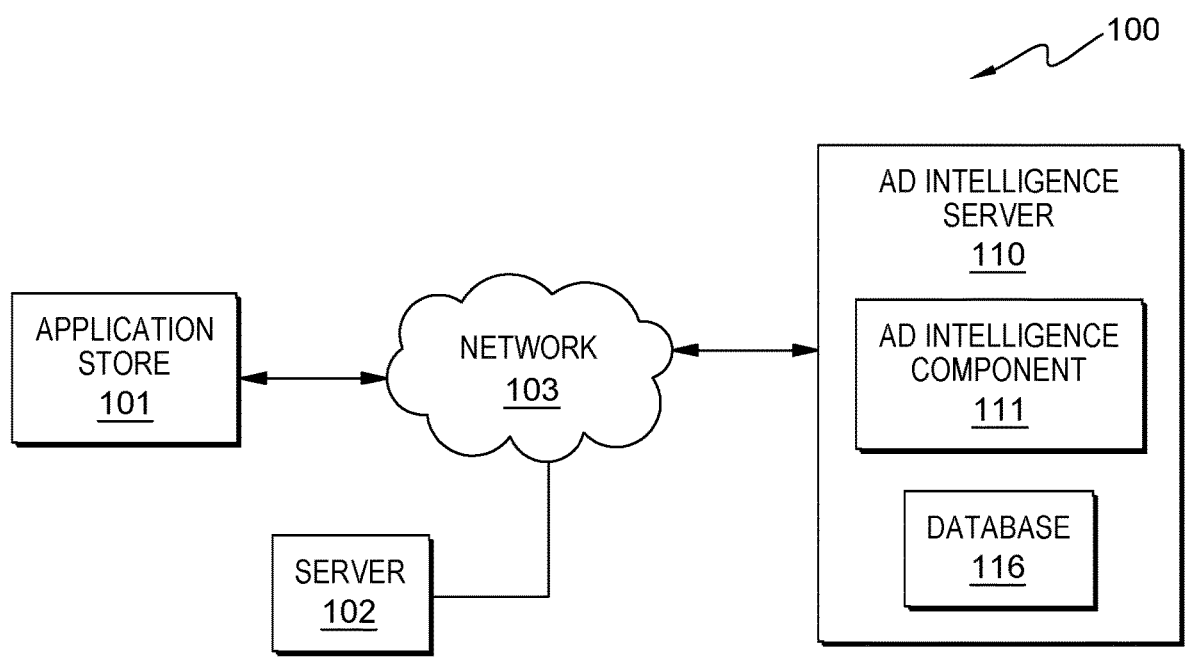
FIG. 1 is a functional block diagram illustrating an ad intelligence environment, designated as 100, in accordance with an embodiment of the present invention.

Embodiments recognize the difficulty for an application owner to identify the feature that the end users are requesting as well as identifying the right tools/product/services in the market that can be leveraged to provide the feature in the application. Furthermore, Embodiments recognize the difficulty in efficiently identifying, via a tool/product/services owner, applications in an application repository/depository store (e.g., Google Play™, etc.) that are missing some features, and further determining that the feature can be implemented/provided by tool/product/services that belong to the application owner. Embodiments of the present invention provide an efficient and intelligent method (via machine learning) that leverages targeted advertisement to provide application owners a path to implement missing features of a given application or to correct defects of the application.

Embodiments recognize that there are social network analysis techniques that can identify influential people who own or are decision makers for a given application. Embodiments provide an application store that leverages review analytics techniques to identify which features are missing in an application. Some embodiments provide and leverage such techniques to identify applications in the application store that already implement the missing feature in an application. Some embodiments provide an identification of tools/product/services that are used by the applications that implemented the feature. Some embodiments provide advertisements of those tools/product/services to application owners via social media platforms that may be utilized by the application owners.

A detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

FIG. 1 is a functional block diagram illustrating ad intelligence environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Ad intelligence environment 100 includes application store 101, server 102 and ad intelligence server 110. All (e.g., 101, 102 and 110) elements are all interconnected over network 103.

Application store 101 is a digital distribution platform/repository for applications. Applications are generally downloaded and/or retrieve from an application distribution platforms or repository which can be operated by the owner of the mobile or computer operating system.

Server 102 can be a standalone computing device, a management server, a web server, a mobile computing device, or any other electronic device or computing system capable of receiving, sending, and processing data. In other embodiments, ad intelligence server 110 can represent a server computing system utilizing multiple computers as a server system, such as in a cloud computing environment. In another embodiment, ad intelligence server 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100 via network 103. In another embodiment, ad intelligence server 110 represents a computing system utilizing clustered computers and components (e.g., database server computers, application server computers, etc.) that act as a single pool of seamless resources when accessed within ad intelligence environment 100. Server 102 can host social media websites, professional networking sites and various online database resources.

Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that can support communications between ad intelligence server 110 and other computing devices (not shown) within ad intelligence environment 100.

Ad intelligence server 110 includes ad intelligence component 111 and database 116.

Ad intelligence component 111 (i) provides an application owner with the capability to identify one or more features that end users are requesting as well as (ii) provides a solution that identifies which tools/product/services in the market that can be leveraged to provide/add the one or more features to the application. Furthermore, after identifying the application, ad intelligence component 111 allows the vendors (i.e., who owns the tools/product/service) to identify the prospective application owners and directed a targeted advertisement to the application owners (via social media platforms or other medium) for the service offered by the vendor (i.e., application owner can use to implement the missing feature in the application).

Ad intelligence component 111 will be described in greater details in regard to FIG. 2.

Database 116 is a repository for data used by ad intelligence component 111. Database 116 can be implemented with any type of storage device capable of storing data and configuration files that can be accessed and utilized by ad intelligence server 110, such as a database server, a hard disk drive, or a flash memory. Database 116 uses one or more of a plurality of techniques known in the art to store a plurality of information. In the depicted embodiment, database 116 resides on ad intelligence server 110. In another embodiment, database 116 may reside elsewhere within ad intelligence environment 100, provided that ad intelligence component 111 has access to database 116. Database 116 may store information associated with application owner, features of application and tools/services required to improve/fix the application.

Figure 2:
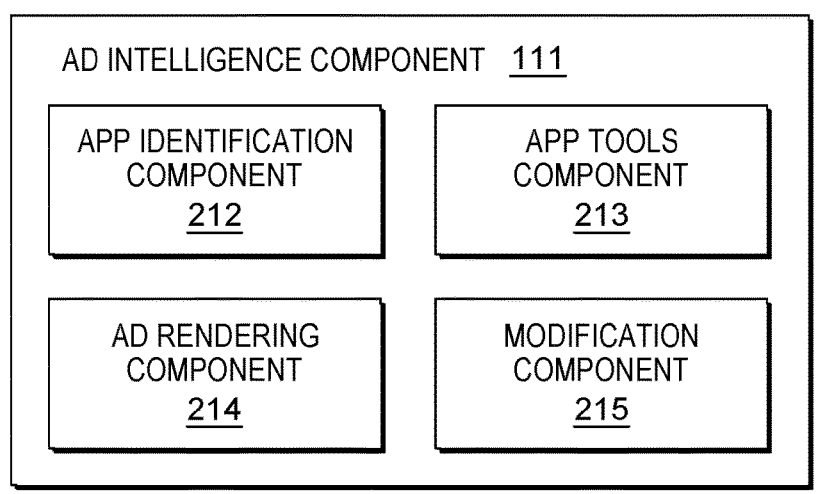
FIG. 2 is a functional block diagram illustrating ad intelligence component in accordance with an embodiment of the present invention.

FIG. 2 is a functional block diagram illustrating ad intelligence component in accordance with an embodiment of the present invention. Ad intelligence component 111 includes application identification component 212, application tools component 213, advertisement rendering component 214, and modification component 215.

As is further described herein below, application identification component 212 of the present embodiment of the invention provides the capability of identifying the owner of the application and current requirements of the application. A use case scenario will be described further below to illustrate the invention. Owner A and Owner B are co-owners of an application, "123XYZ", that allows users to automatically track and calculate calories of by entering the name of meals from a number of restaurants in the United States. Owner A does not have a social media account, but Owner B does have a personal and a professional social media profile. Their application, "123XYZ", is available in multiple mobile operating platform, for example on both iOS and Android. Owner A is the programmer for the application while Owner B is the marketing and president of their joint venture.

The system can start by performing analytics, via machine learning, on the mobile application store/repository to identify applications (A) based on various criteria in accordance with a given embodiment and scenario. The criteria used by machine learning to identify applications can be dynamically adjusted by the user and can include, but it is not limited, to one or a combination of: popularity ranking, most downloaded, highest rating (e.g., based on user rating feedback, etc.), and cost of application (e.g., most or least expensive, etc.). Once the targeted application (A) has been identified by the system, the system identifies the various owners of the application. It is noted that there can be more than one owner of the application (e.g., the identified owners are Owner A and Owner B). In some embodiments, the application store receives a permission from the application purchaser to use and/or divulge at least some of their personal information, such as, but is not limited to, their identity and the application that was purchased. In one example, the system has identified that "123XYZ" application is very popular based on the retrieved information from the application store. The system identifies the various owners that are associated with the application "123XYZ", e.g., that purchased and/or downloaded the application "123XYZ". The identity of the owner can be retrieved from the application store. Based on the retrieved information, the system has identified Owner B and Owner A as owners of "123XYZ" application. Next, the system determines the influential owner from the group (i.e., Owner B and Owner A) based on machine learning. The system can leverage any existing techniques of social media analytics that are already in use, or are available for use, on professional social networks. Based on the results of the social media analysis, the system can discover highly influential people (e.g., owners of the application), designated as (P). It was previously identified that "123XYZ" application has two owners, Owner B and Owner A. The system will determine and select the most influential individual from the one or more owners based on a set of selection rules, which may be configurable. For example, the system can decide that the CTO (Chief Technology Officer) is the most influential owner of the application instead of the Programmer or CEO (Chief Operating Officer). In the current use case, the system determines that Owner B is the more influential owner of the application (i.e., Marketing and President status) based on Owner B's social and professional media activities (i.e., promoting the application).

Alternatively, the system can search for owners (P) first and identify the application (A) belonging to the owners. For example, following the previously mentioned use case, the system determines that Owner B is the most influential person based on their social and professional media activities. The system searches for applications related to Owner B and the system identifies the "123XYZ" application based on its association with Owner B. For example, the descriptive material, on the application store, that is associated with the "123XYZ" application lists the owners and developers of the "123XYZ" application. The system compares the names of the owners and developers of the "123XYZ" application to the name of Owner B and determines that there is a match.

Furthermore, in some embodiments, the system performs an application store review analytics and semantics analysis, using existing techniques such as semantic analysis, to ascertain possible future requirements of the application, designated as (R). Continuing using the previous use case for "123XYZ" application, the system identifies information on the application store website that indicates that the "123XYZ" application has been released for over a year and that there are several feedback and requests written by users, which are posted as comments on an application store webpage. Based, at least in part, on a semantic and contextual analysis of the comments, the system determines that some users have mentioned that there is a defect where the "123XYZ" application is not able to distinguish between various categories of foods, such as such as breakfast, brunch, lunch, and dinner cuisine using a cuisine identification database and a set of cuisine identification rules. Based on a second comment, the system further determines that some users have mentioned that it would nice to take a picture of the food and have the application recognize the food and automatically store all pertinent nutritional information (e.g., calories, fiber, carbohydrates, etc.) The system is able to recognize that the second comment includes an indication of a missing, or otherwise desired, feature for the "123XYZ" application. As such, the system determines that this feature meets the criteria that indicate a possible future requirement of the "123XYZ" application.

Thus, the system can perform an application store review analytics and semantics analysis on the review and identifies the possible future requirements of a given application. The system leverages existing technology such as web crawling to identify (R) based on the webpage of the application in the application store. Thus, the system is able to identify current defects (e.g., that the cuisine identification database is not working with the "123XYZ" application) and a future requirement (e.g., adding object identification with a camera to the functionality/features of the "123XYZ" application). To summarize, application identification component 212 discovers and creates a one or more relationships between (P), (A) and (R) and makes determinations based on those relationships.

As is further described herein below, application tools component 213 of the present embodiment of the invention provides the capability of identifying tools/products/services through machine learning that can be used to implement a given possible future requirements (R). After application identification component 212 has created (R), application tools component 213 performs a web-crawling service to search for and identify tools/products/services, designated as (T), which can be used to provide the possible future requirements of the "123XYZ" application.

In one embodiment, the system leverages a web-crawling service to perform a semantic text comparison between the requirement text with the feature specifications of various tools/SDK (Software Development Kit)/services in the market. It is noted that a number of web crawling and/or semantic analyzer technologies are currently available and may be used to identify (T). Furthermore, the system identifies an owner, designated as (S), of such tools/SDK/services by leveraging known techniques in the art, such as social medial analytics and processing social media data.

Continuing with the previous use case scenario regarding "123XYZ" application, application identification component 212 is able to search for the specific SDK that will resolve the defect (i.e., relating to food not being recognized as belonging to a category of cuisine) and is able to find a vendor, (S) that owns the SDK. It is noted that there can one vendor/services that can satisfy all requirements or there can be multiple vendors and/or services that can satisfy different requirements. For example, Vendor A has a solution/service to fix the defect on the "123XYZ" application but does not have the skill to add food recognition via camera as a new feature. However, Vendor B has the ability to add such a feature. Furthermore, Vendor C has the ability to satisfy all requirements (i.e., fix the defect and add the new feature). To summarize, application tools component 213 identifies tools/services (T) and the owner (S) related to those tools/services (T).

Additionally, assuming the "123XYZ" application is free, but the owners would like to monetize the application and use the money for future enhancement and features. For that purpose, the system can recognize and identify feedback/comments regarding the application and add a message to the comment on the webpage stating, for example, "We would like to add new features to the application, but we cannot continue to do so without funding. Please donate to help us grow." Thus, the system can identify a new enhancement to "123XYZ" application and provide a mechanism to facilitate the addition of that enhancement, e.g., by adding an online payment solution and indicating the need for funding to add the feature.

As is further described herein below, ad rendering component 214 of the present embodiment of the invention provides the capability of creating a bidding system through machine learning based on known variables (P), (A), (R), (T) and (S). The bidding system communicates with (i) SDK owners (S) of tools/services (T) and (ii) launches/executes a runtime bidding for all owners (S) of (T) to register with the system. By registering with the system, owners (S) of (T), can participate in the bidding to provide services/tools to owners of the application (A).

In this embodiment, there are several factors that influence bidding, such as, but is not limited to, cost, time and complexity. For example, the cost of bidding could be dynamic and can be base number of participating owners (A), influence status of (A) and past success rate with owners (A). A winner, designated as (W), of the bidding process is selected by the system based on a set of criteria that may be configured by the owners of a given application to be modified, e.g., "123XYZ" application. The winner of the bidding process is then sent a confirmation of winning the bid and the system generates a product advertisement that includes at least some details of the winning bid. Based on the winner in the bidding process, the system sends the product advertisement related to (W) to owners (P).

Continuing with the previous use case scenario, the system has identified Owner B as an "influential" person (i.e., owner) for "123XYZ" application. The system through application tools component 213 has already identified two requirements (i.e., a defect and one enhancement) for the application. Therefore, ad rendering component 214 launches a bidding system for Vendor A, B and C. For example, ad rendering component 214 contacts Vendors A, B and C and invites the vendors to register with the bidding system in order to win a contract with a potential customer/client. After a predefined minimum number of the vendors have registered, the predetermined time bidding process begins. It is noted the predefined minimum number and predetermined time is adjustable by the user of the system. Vendor C is the highest bidder and is awarded the right to advertise exclusively to Owner B for a nominal fee. Ad rendering component 214 creates several advertisements customized for Owner B based on frequent platforms and/or websites used by Owner B. The web-based advertisement can include, but it is not limited to, pay per click, click throughs, pop-up, display ads, search engine marketing, email marketing, etc. For example, Owner B spends most of his time on fitness website to promote this "123XYZ" application. Therefore, ad rendering component 214, target the advertisement on those websites using pop-up and click throughs.

As is further described herein below, modification component 215 of the present embodiment of the invention provides the capability modifying the application (A) by the winning vendor (W). The system through modification component 215 can facilitate the interaction between the application owner and the winning vendor based on the application owner accepting the targeted advertisement. For example, continuing using the "123XYZ" application scenario, Owner B clicks on the targeted advertisement to find out more about services/tools offered the vendor. Owner B is interested in fixing the defect by adding the missing feature to the application. Therefore, owner B can click on the "CONTACT US" button on the targeted advertisement. Modification component 215 can act as an intermediary and facilitating the communication between Owner B and Vendor C. Based, in part, on a detection of owner feedback, e.g., the owner clicking the "CONTACT US" button, the system, through modification component 215, receives notification from the application owner, indicating that the owner would like to engage the vendor. The system notifies the vendor and a contract (i.e. engagement to fix/modify the application) can be created dynamically between Vendor C and Owner B. Furthermore, the system through modification component 215 can validate that Vendor C has provided the program code updates needed to satisfy the requirements of the application. For example, the system, through modification component 215 can perform a web crawl of the application from the application store for feedback from the users based on the post-fix/modification. Based on the positive feedback from the users and/or validation from the owner (A), modification component can deem the contract as fulfilled. Otherwise, modification component 215 can engage a non-winning vendor, Vendor B, to satisfy the requirements.

In another embodiment, the system through modification component 215 can fix the defect and/or add new features to the existing application. Based on the created contact and/or other means of acceptance (for engaging a vendor and owner of the application), modification component 215 can satisfy the requirement of the application. For example, a monetization feature requested for "123XYZ", can be easily remedied by adding a payment SDK or API (application protocol interface) to a universal payment by modification component 215. Embodiments recognize that certain types of application features may exist as "plug-in" modules, i.e., they include executable code that can be added to an existing application to provide a given feature within that application. As such, in some scenarios and embodiments, modification program 215 automatically identifies patches/program code, e.g., a plug-in, that is received from the vendor and then applied to the existing application thereby fixing the defect and/or adding the new feature to the existing application.

Figure 3:
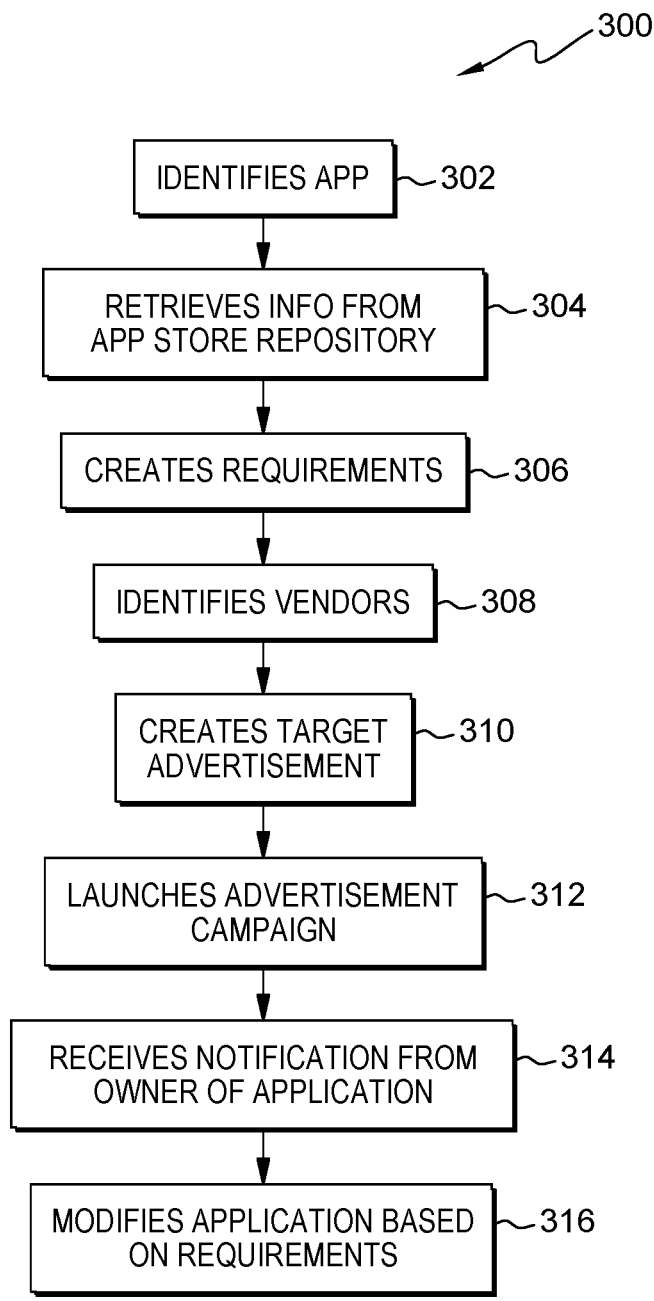
FIG. 3 is a flowchart illustrating the operation of an ad intelligence system, designated as 300, in accordance with an embodiment of the present invention.

FIG. 3 is a flowchart illustrating the activity of ad intelligence component 111, designated as 300, in accordance with an embodiment of the present invention. The use case of "123XYZ" will be used as an example to further illustrate the flowchart.

Ad intelligence component 111 identifies a software application from a mobile store repository (step 302). In an embodiment, ad intelligence component 111 through application identification component 212 identifies the software application. For example, "123XYZ" application is identified.

Ad intelligence component 111 retrieves information from the software repository (step 304). In an embodiment, ad intelligence component 111 through application identification component 212 identifies the one or more owners of the application (i.e., previously identified from step 302). For example, Owner B and Owner A are identified as co-owners of "123XYZ". However, in this embodiment and example, only one will be selected as the most influential owner. Thus, Owner B is selected by ad intelligence component 111 as the application owner of "123XYZ".

Ad intelligence component 111 creates requirements (step 306). In an embodiment, ad intelligence component 111 through application identification component 212 creates requirements for the application. For example, ad intelligence component 111 identifies one defect (e.g., the cuisine identifying feature not working) and a future requirement (e.g., using the camera to identify/track food, and its characteristics, instead of selecting/typing in the name of the food) for the "123XYZ" application.

Ad intelligence component 111 identifies vendors (step 308). In an embodiment, ad intelligence component 111 through ad rendering component 214 identifies one or more vendors. Ad rendering component 214 creates a bidding system for those vendors and selects the winning vendor from the bidding system. For example, vendor A, B and C are notified by ad intelligence component 111 that there is a potential client/customer that will require the services from the vendors and the vendors are asked to register with the bidding system. Once all vendor registers with the bidding system, the bidding process to win the client begins. Vendor C is selected due to the final winning bid.

Ad intelligence component 111 creates a targeted advertisement (step 310). In an embodiment, ad intelligence component 111 through ad rendering component 214 creates a targeted advertisement for the winning vendor. The targeted advertisement is directed to the owner of the application. For example, Owner B is known to promote "123XYZ" application on various health websites and blogs. Therefore, the created targeted advertisement is configured based, at least in part, on the behavior of Owner B on those websites and blogs.

Ad intelligence component 111 launches advertisement campaign (step 312). In an embodiment, ad intelligence component 111 through ad rendering component 214 launches the targeted advertisement aimed at the application owner. For example, a targeted pop-up ad is used on a social media and health website that is frequented by Owner B.

Ad intelligence component 111 receives notification from the owner of the application (step 314). In an embodiment, ad intelligence component 111 through modification component 214 notifies the winning vendor that the application owner has engaged the vendor to fix the defect and/or add new features. For example, Owner B sees the targeted advertisement on his favorite website and decides to click on the advertisement for further information. After reading on regarding the vendor's capability, Owner B decides to engage Vendor C by clicking on "ENGAGE US" button. A notification is sent from the targeted advertisement to ad intelligence component 111 regarding the intent of Owner B.

Ad intelligence component 111 modifies the application based on the requirements (step 316). In an embodiment, ad intelligence component 111 through modification component 214 can engage the vendor to fix the defect and/or add features to the application. For example, modification component can direct Vendor C to satisfy the requirement of the application by fixing the defect (i.e., that the cuisine identification database is not working) and add the feature (i.e., adding object identification with a camera). Furthermore, modification component 214 can validate the results of the requirements by performing a web crawl on the application store based on the new feedback of the users.

The present invention may be a system, a method, and/or a computer program product. The computer program product may include a computer readable storage medium (or media) having computer readable program instructions thereon for causing a processor to carry out aspects of the present invention.

Figure 4:
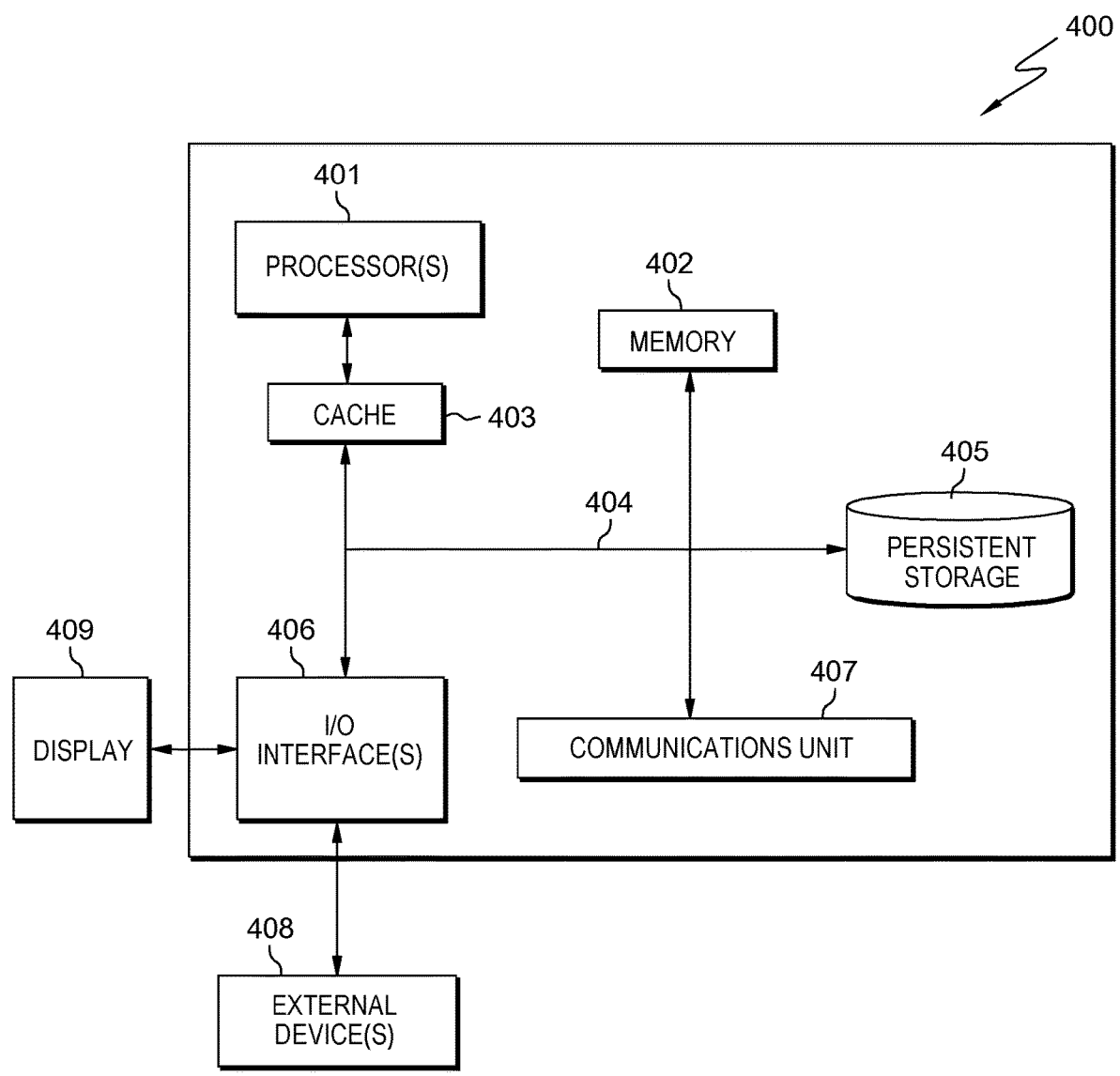
FIG. 4 depicts a block diagram, designated as 400, of components of a server computer capable of executing the ad intelligence component within the ad intelligence environment, of FIG. 1, in accordance with an embodiment of the present invention.

FIG. 4 depicts a block diagram of components of ad intelligence component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data ×10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Ad intelligence component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Ad intelligence component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Ad intelligence component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for allowing an owner of a software application that is located in a software application store repository to implement missing features and/or correct defects associated with the software application, the computer-implemented method comprising:
    identifying, by one or more computer processors, a software application from the software application store repository based on machine learning;
    retrieving, by the one or more computer processors, information from the software application store repository associated with the software application;
    creating, by the one or more computer processors, a requirement based on the retrieved information based on the machine learning, wherein the requirement comprises of building a desired feature and/or fixing one or more defects associated with the software application and identifying the one or more defects and/or the desired feature is based on web-crawling service on a plurality of web reviews left by customers;
    identifying, by the one or more computer processors, one or more vendors based on the requirement based on the machine learning;
    creating, by the one or more computer processors, the targeted advertisement aimed at an application owner based on the identified vendor from the one or more vendors based on the machine learning further comprises:
        searching, by the one or more computer processors, for the one or more vendors based on the requirements;
        creating, by the one or more computer processors, a bidding system requiring the one or more vendor to register and wherein the bidding system further comprises:
            a multi-factor variable utilized by the bidding system to determine relationships consisting of P, A, R, T and S, wherein variable P corresponds to owner of the software application, variable A corresponds to the software application, variable R corresponds to future requirements of the software system, variable T corresponds to tools and/or services offered by the one or more vendor and S corresponds to the one or more vendors; and
            other factors that influence the bidding system comprises of cost, time, and complexity;
        winning the bidding system by the identified vendor from the one or more vendors, wherein winning comprises of submitting the highest bid;
    launching, by the one or more computer processors, an advertisement campaign based on the created target advertisement;
    receiving, by the one or more computer processors, a notification from the application owner to provide at least one service associated with the identified vendor to meet the requirement of the software application;
    modifying, by the one or more computer processors, the software application based on the requirement; and
    validating that the modifications to the software application has been successfully completed by web crawling a plurality of positive reviews as feedback from the customers.

2. The computer-implemented method of claim 1, wherein identifying a product from the software application repository, further comprising:
    determining, by the one or more computer processors and through machine learning, the software application from the software application repository, based on one or more requirements, wherein the one or more requirement comprises of, but is not limited to, the most downloaded, most popular and most expensive.

3. The computer-implemented method of claim 1, further comprising:
    determining, by the one or more computer processors, the software application owner associated with the identified software application based on machine learning.

4. The computer-implemented method of claim 1, wherein creating a requirement based on the retrieved information, further comprising:
    identifying, by the one or more computer processors, the retrieved information wherein the retrieved information comprises of a feedback written by application users; and
    generating, by the one or more computer processors, the requirement based on the identified information.

5. The computer-implemented method of claim 1, further comprising:
    creating a donation-based system from the customers to further fund the modification of the software application and collecting payments from the customers.

6. The computer-implemented method of claim 1, wherein creating the target advertisement aimed at the application owner based on the identified vendor further comprises of, but is not limited to, pay per click, click throughs, pop-up, display ads and search engine marketing.

7. The computer-implemented method of claim 1, wherein launching the advertisement campaign further comprises of placing the advertisement on one or more websites frequented by the application owner.

8. A computer program product for allowing an owner of a software application that is located in a software application store repository to implement missing features and/or correct defects associated with the software application, the computer program product comprising:
one or more computer readable storage media and program instructions stored on the one or more computer readable storage media, the program instructions comprising:
program instructions to identify a software application from the software application repository;
program instructions to retrieve information from the software application repository associated with the software application;
program instructions to create a requirement based on the retrieved information, wherein the requirements comprises of building a desired feature and/or fixing one or more defects associated with the software application and identifying the one or more defects and/or the desired feature is based on web-crawling service on a plurality of web reviews left by customers;
program instructions to identify one or more vendor based on the requirement;
program instructions to create the targeted advertisement aimed at an application owner based on the identified vendor from the one or more vendors further comprises:
program instructions to searching for the one or more vendors based on the requirements;
program instructions to creating a bidding system requiring the one or more vendor to register and wherein the bidding system further comprises:
a multi-factor variable utilized by the bidding system to determine relationships consisting of P, A, R, T and S, wherein variable P corresponds to owner of the software application, variable A corresponds to the software application, variable R corresponds to future requirements of the software system, variable T corresponds to tools and/or services offered by the one or more vendor and S corresponds to the one or more vendors; and
other factors that influence the bidding system comprises of cost, time, and complexity;
program instructions to winning the bidding system by the identified vendor from the one or more vendors, wherein winning comprises of submitting the highest bid;
program instructions to launch an advertisement campaign based on the created target advertisement;
program instructions to receive a notification from the application owner to provide at least one service associated with the identified vendor to meet the requirement of the software application;
program instructions to modify the software application based on the requirement; and
program instructions to validate that the modifications to the software application has been successfully completed by web crawling a plurality of positive reviews as feedback from the customers.

9. The computer program product of claim 8, wherein identify a software application from the software application repository, the computer program product further comprising:
program instructions to determine the software application from the software application repository, based on one or more requirements, wherein the one or more requirement comprises of, but is not limited to, the most downloaded, most popular and most expensive.

10. The computer program product of claim 8, the computer program product comprising:
program instructions to determine the software application owner associated with the identified software application.

11. The computer program product of claim 8, wherein creating a requirement based on the retrieved information the computer program product comprising:
program instructions to identify the retrieved information wherein the retrieved information comprises of a feedback written by application users; and
program instructions to generate the requirement based on the identified information.

12. The computer program product of claim 8, further comprising:
program instructions to create a donation-based system from the customers to further fund the modification of the software application and collecting payments from the customers.

13. The computer program product of claim 8, wherein creating the target advertisement aimed at the application owner based on the identified vendor further comprises of, but is not limited to, pay per click, click throughs, pop-up, display ads and search engine marketing.

14. The computer program product of claim 8, wherein launching the advertisement campaign further comprises of placing the advertisement on one or more websites frequented by the application owner.

15. A computer system for allowing an owner of a software application, the computer system comprising:
one or more computer processors;
one or more computer readable storage media;
program instructions stored on the one or more computer readable storage media for execution by at least one of the one or more computer processors, the program instructions comprising:
program instructions to identify a software application from the software application repository;
program instructions to retrieve information from the software application repository associated with the software application;
program instructions to create a requirement based on the retrieved information, wherein the requirements comprises of building a desired feature and/or fixing one or more defects associated with the software application and identifying the one or more defects and/or the desired feature is based on web-crawling service on a plurality of web reviews left by customers;
program instructions to identify one or more vendor based on the requirement;
program instructions to create the targeted advertisement aimed at an application owner based on the identified vendor from the one or more vendors further comprises:
program instructions to searching for the one or more vendors based on the requirements;
program instructions to creating a bidding system requiring the one or more vendor to register and wherein the bidding system further comprises:
a multi-factor variable utilized by the bidding system to determine relationships consisting of P, A, R, T and S, wherein variable P corresponds to owner of the software application, variable A corresponds to the software application, variable R corresponds to future requirements of the software system, variable T corresponds to tools and/or services offered by the one or more vendor and S corresponds to the one or more vendors; and other factors that influence the bidding system comprises of cost, time, and complexity;

program instructions to winning the bidding system by the identified vendor from the one or more vendors, wherein winning comprises of submitting the highest bid;

program instructions to launch an advertisement campaign based on the created target advertisement;

program instructions to receive a notification from the application owner to provide at least one service associated with the identified vendor to meet the requirement of the software application;

program instructions to modify the software application based on the requirement; and program instructions to validate that the modifications to the software application has been successfully completed by web crawling a plurality of positive reviews as feedback from the customers.

16. The computer system of claim 15, wherein identify a software application from the software application repository, the computer system further comprising:

program instructions to determine the software application from the software application repository, based on one or more requirements, wherein the one or more requirement comprises of, but is not limited to, the most downloaded, most popular and most expensive.

17. The computer system of claim 15, wherein creating a requirement based on the retrieved information, the computer system comprising:

program instructions to identify the retrieved information wherein the retrieved information comprises of a feedback written by application users; and program instructions to generate the requirement based on the identified information.

18. The computer system of claim 8, further comprising:

program instructions to create a donation-based system from the customers to further fund the modification of the software application and collecting payments from the customers.

19. The computer system of claim 15, wherein creating the target advertisement aimed at the application owner based on the identified vendor further comprises of, but is not limited to, pay per click, click throughs, pop-up, display ads and search engine marketing.

20. The computer system of claim 15, wherein launching the advertisement campaign further comprises of placing the advertisement on one or more websites frequented by the application owner.

* * * * *